US007906080B1

(12) United States Patent
Botvinnik

(10) Patent No.: US 7,906,080 B1
(45) Date of Patent: Mar. 15, 2011

(54) AIR TREATMENT APPARATUS HAVING A LIQUID HOLDER AND A BIPOLAR IONIZATION DEVICE

(75) Inventor: Igor Y. Botvinnik, Novato, CA (US)

(73) Assignee: Sharper Image Acquisition LLC, New York, NY (US)

( * ) Notice: Subject to any disclaimer, the term of this patent is extended or adjusted under 35 U.S.C. 154(b) by 1019 days.

(21) Appl. No.: 11/694,281

(22) Filed: Mar. 30, 2007

Related U.S. Application Data

(63) Continuation-in-part of application No. 11/007,734, filed on Dec. 8, 2004, now Pat. No. 7,517,505, and a continuation-in-part of application No. 10/791,561, filed on Mar. 2, 2004, now Pat. No. 7,517,503.

(60) Provisional application No. 60/500,437, filed on Sep. 5, 2003.

(51) Int. Cl.
*B01J 19/08* (2006.01)
*B03C 3/014* (2006.01)

(52) U.S. Cl. ........................ 422/186.04; 422/121; 96/27

(58) Field of Classification Search ............. 422/188.04, 422/121; 96/27
See application file for complete search history.

(56) References Cited

U.S. PATENT DOCUMENTS

| | | | |
|---|---|---|---|
| 653,421 | A | 7/1900 | Lorey |
| 895,729 | A | 8/1908 | Carlborg |
| 995,958 | A | 6/1911 | Goldberg |
| 1,791,338 | A | 2/1931 | Wintermute |
| 1,869,335 | A | 7/1932 | Day |
| 1,882,949 | A | 10/1932 | Ruder |
| 2,129,783 | A | 9/1938 | Penney |
| 2,247,409 | A | 7/1941 | Roper |
| 2,327,588 | A | 8/1943 | Bennett |
| 2,359,057 | A | 9/1944 | Skinner |
| 2,509,548 | A | 5/1950 | White |
| 2,590,447 | A | 3/1952 | Nord et al. |
| 2,949,550 | A | 8/1960 | Brown |
| 2,978,066 | A | 4/1961 | Nodolf |
| 3,018,394 | A | 1/1962 | Brown |
| 3,026,964 | A | 3/1962 | Penney |
| 3,374,941 | A | 3/1968 | Okress |
| 3,412,530 | A | 11/1968 | Cardiff |
| 3,518,462 | A | 6/1970 | Brown |
| 3,540,191 | A | 11/1970 | Herman |
| 3,581,470 | A | 6/1971 | Aitkenhead et al. |
| 3,638,058 | A | 1/1972 | Fritzius |
| 3,744,216 | A | 7/1973 | Halloran |
| 3,806,763 | A | 4/1974 | Masuda |
| 3,892,927 | A | 7/1975 | Lindenberg |
| 3,945,813 | A | 3/1976 | Iinoya et al. |
| 3,958,960 | A | 5/1976 | Bakke |
| 3,958,961 | A | 5/1976 | Bakke |

(Continued)

FOREIGN PATENT DOCUMENTS

EP 0332624 B1 1/1992

(Continued)

*Primary Examiner* — Kishor Mayekar
(74) *Attorney, Agent, or Firm* — Arent Fox LLP

(57) ABSTRACT

An air treatment apparatus that includes a housing; a plurality of electrodes, at least one of which receives liquid from a liquid supply; and a power supply. The power supply is operable to establish an electric potential between a portion of the liquid-receiving electrode and the other electrode so that the air treatment apparatus produces a liquid mist having a bipolar distribution of liquid particles.

6 Claims, 2 Drawing Sheets

U.S. PATENT DOCUMENTS 3,958,962 A 5/1976 Hayashi
3,960,505 A * 6/1976 Marks .......................... 422/168
3,981,695 A 9/1976 Fuchs
3,984,215 A 10/1976 Zucker
3,988,131 A 10/1976 Kanazawa et al.
4,007,024 A 2/1977 Sallee et al.
4,052,177 A 10/1977 Kide
4,056,372 A 11/1977 Hayashi
4,070,163 A 1/1978 Kolb et al.
4,074,983 A 2/1978 Bakke
4,092,134 A 5/1978 Kikuchi
4,097,252 A 6/1978 Kirchhoff et al.
4,102,654 A 7/1978 Pellin
4,104,042 A 8/1978 Brozenick
4,110,086 A 8/1978 Schwab et al.
4,119,415 A 10/1978 Hayashi et al.
4,126,434 A 11/1978 Keiichi
4,138,233 A 2/1979 Masuda
4,147,522 A 4/1979 Gonas et al.
4,155,792 A 5/1979 Gelhaar et al.
4,171,975 A 10/1979 Kato et al.
4,185,971 A 1/1980 Isahaya
4,189,308 A 2/1980 Feldman
4,205,969 A 6/1980 Matsumoto
4,209,306 A 6/1980 Feldman et al.
4,218,225 A 8/1980 Kirchhoff et al.
4,225,323 A 9/1980 Zarchy et al.
4,227,894 A 10/1980 Proynoff
4,231,766 A 11/1980 Spurgin
4,232,355 A 11/1980 Finger et al.
4,244,710 A 1/1981 Burger
4,244,712 A 1/1981 Tongret
4,251,234 A 2/1981 Chang
4,253,852 A 3/1981 Adams
4,259,093 A 3/1981 Vlastos et al.
4,259,452 A 3/1981 Yukuta et al.
4,259,707 A 3/1981 Penney
4,264,343 A 4/1981 Natarajan et al.
4,266,948 A 5/1981 Teague et al.
4,282,014 A 8/1981 Winkler et al.
4,284,420 A 8/1981 Borysiak
4,289,504 A 9/1981 Scholes
4,293,319 A 10/1981 Claassen, Jr.
4,308,036 A 12/1981 Zahedi et al.
4,315,188 A 2/1982 Cerny et al.
4,318,718 A 3/1982 Utsumi et al.
4,338,560 A 7/1982 Lemley
4,342,571 A 8/1982 Hayashi
4,349,359 A 9/1982 Fitch et al.
4,351,648 A 9/1982 Penney
4,354,861 A 10/1982 Kalt
4,357,150 A 11/1982 Masuda et al.
4,362,632 A 12/1982 Jacob
4,363,072 A 12/1982 Coggins
4,366,525 A 12/1982 Baumgartner
4,369,776 A 1/1983 Roberts
4,375,364 A 3/1983 Van Hoesen et al.
4,380,900 A 4/1983 Linder et al.
4,386,395 A 5/1983 Francis, Jr.
4,391,614 A 7/1983 Rozmus
4,394,239 A 7/1983 Kitzelmann et al.
4,405,342 A 9/1983 Bergman
4,406,671 A 9/1983 Rozmus
4,412,850 A 11/1983 Kurata et al.
4,413,225 A 11/1983 Donig et al.
4,414,603 A 11/1983 Masuda
4,435,190 A 3/1984 Taillet et al.
4,440,552 A 4/1984 Uchiya et al.
4,443,234 A 4/1984 Carlsson
4,445,911 A 5/1984 Lind
4,477,263 A 10/1984 Shaver et al.
4,477,268 A 10/1984 Kalt
4,481,017 A 11/1984 Furlong
4,496,375 A 1/1985 Levantine
4,502,002 A 2/1985 Ando
4,505,724 A 3/1985 Baab
4,509,958 A 4/1985 Masuda et al.
4,514,780 A 4/1985 Brussee et al.
4,515,982 A 5/1985 Lechtken et al.
4,516,991 A 5/1985 Kawashima
4,521,229 A 6/1985 Baker et al.
4,522,634 A 6/1985 Frank
4,534,776 A 8/1985 Mammel et al.
4,536,698 A 8/1985 Shevalenko et al.
4,544,382 A 10/1985 Taillet et al.
4,555,252 A 11/1985 Eckstein
4,569,684 A 2/1986 Ibbott
4,582,961 A 4/1986 Frederiksen
4,587,475 A 5/1986 Finney, Jr. et al.
4,588,423 A 5/1986 Gillingham et al.
4,590,042 A 5/1986 Drage
4,597,780 A 7/1986 Reif
4,597,781 A 7/1986 Spector
4,600,411 A 7/1986 Santamaria
4,601,733 A 7/1986 Ordines et al.
4,604,174 A 8/1986 Bollinger et al.
4,614,573 A 9/1986 Masuda
4,623,365 A 11/1986 Bergman
4,626,261 A 12/1986 Jorgensen
4,632,135 A 12/1986 Lenting et al.
4,632,746 A 12/1986 Bergman
4,636,981 A 1/1987 Ogura
4,643,744 A 2/1987 Brooks
4,643,745 A 2/1987 Sakakibara et al.
4,647,836 A 3/1987 Olsen
4,650,648 A 3/1987 Beer et al.
4,656,010 A 4/1987 Leitzke et al.
4,657,738 A 4/1987 Kanter et al.
4,659,342 A 4/1987 Lind
4,662,903 A 5/1987 Yanagawa
4,666,474 A 5/1987 Cook
4,668,479 A 5/1987 Manabe et al.
4,670,026 A 6/1987 Hoenig
4,673,416 A 6/1987 Sakakibara et al.
4,674,003 A 6/1987 Zylka
4,680,496 A 7/1987 Letournel et al.
4,686,370 A 8/1987 Blach
4,689,056 A 8/1987 Noguchi et al.
4,691,829 A 9/1987 Auer
4,692,174 A 9/1987 Gelfand et al.
4,693,869 A 9/1987 Pfaff
4,694,376 A 9/1987 Gesslauer
4,702,752 A 10/1987 Yanagawa
4,713,092 A 12/1987 Kikuchi et al.
4,713,093 A 12/1987 Hansson
4,713,724 A 12/1987 Voelkel
4,715,870 A 12/1987 Masuda et al.
4,725,289 A 2/1988 Quintilian
4,726,812 A 2/1988 Hirth
4,726,814 A 2/1988 Weitman
4,736,127 A 4/1988 Jacobsen
4,743,275 A 5/1988 Flanagan
4,749,390 A 6/1988 Burnett et al.
4,750,921 A 6/1988 Sugita et al.
4,760,302 A 7/1988 Jacobsen
4,760,303 A 7/1988 Miyake
4,765,802 A 8/1988 Gombos et al.
4,771,361 A 9/1988 Varga
4,772,297 A 9/1988 Anzai
4,776,515 A * 10/1988 Michalchik ....................... 239/3
4,779,182 A 10/1988 Mickal et al.
4,781,736 A 11/1988 Cheney et al.
4,786,844 A 11/1988 Farrell et al.
4,789,801 A 12/1988 Lee
4,808,200 A 2/1989 Dallhammer et al.
4,811,159 A 3/1989 Foster, Jr.
4,822,381 A 4/1989 Mosley et al.
4,853,005 A 8/1989 Jaisinghani et al.
4,869,736 A 9/1989 Ivester et al.
4,892,713 A 1/1990 Newman
4,929,139 A 5/1990 Vorreiter et al.
4,940,470 A 7/1990 Jaisinghani et al.
4,940,894 A 7/1990 Morters
4,941,068 A 7/1990 Hofmann
4,941,224 A 7/1990 Saeki et al.
4,944,778 A 7/1990 Yanagawa
4,954,320 A 9/1990 Birmingham et al.

| | | | |
|---|---|---|---|
| 4,955,991 | A | 9/1990 | Torok et al. |
| 4,966,666 | A | 10/1990 | Waltonen |
| 4,967,119 | A | 10/1990 | Torok et al. |
| 4,976,752 | A | 12/1990 | Torok et al. |
| 4,978,372 | A | 12/1990 | Pick |
| D315,598 | S | 3/1991 | Yamamoto et al. |
| 5,003,774 | A | 4/1991 | Leonard |
| 5,006,761 | A | 4/1991 | Torok et al. |
| 5,010,869 | A | 4/1991 | Lee |
| 5,012,093 | A | 4/1991 | Shimizu |
| 5,012,094 | A | 4/1991 | Hamade |
| 5,012,159 | A | 4/1991 | Torok et al. |
| 5,022,979 | A | 6/1991 | Hijikata et al. |
| 5,024,685 | A | 6/1991 | Torok et al. |
| 5,030,254 | A | 7/1991 | Heyen et al. |
| 5,034,033 | A | 7/1991 | Alsup et al. |
| 5,037,456 | A | 8/1991 | Yu |
| 5,045,095 | A | 9/1991 | You |
| 5,053,912 | A | 10/1991 | Loreth et al. |
| 5,059,219 | A | 10/1991 | Plaks et al. |
| 5,061,462 | A | 10/1991 | Suzuki |
| 5,066,313 | A | 11/1991 | Mallory, Sr. |
| 5,072,746 | A | 12/1991 | Kantor |
| 5,076,820 | A | 12/1991 | Gurvitz |
| 5,077,468 | A | 12/1991 | Hamade |
| 5,077,500 | A | 12/1991 | Torok et al. |
| 5,100,440 | A | 3/1992 | Stahel et al. |
| RE33,927 | E | 5/1992 | Fuzimura |
| D326,514 | S | 5/1992 | Alsup et al. |
| 5,118,942 | A | 6/1992 | Hamade |
| 5,125,936 | A | 6/1992 | Johansson |
| 5,136,461 | A | 8/1992 | Zellweger |
| 5,137,546 | A | 8/1992 | Steinbacher et al. |
| 5,141,529 | A | 8/1992 | Oakley et al. |
| 5,141,715 | A | 8/1992 | Sackinger et al. |
| D329,284 | S | 9/1992 | Patton |
| 5,147,429 | A | 9/1992 | Bartholomew et al. |
| 5,154,733 | A | 10/1992 | Fujii et al. |
| 5,158,580 | A | 10/1992 | Chang |
| D332,655 | S | 1/1993 | Lytle et al. |
| 5,180,404 | A | 1/1993 | Loreth et al. |
| 5,183,480 | A | 2/1993 | Raterman et al. |
| 5,196,171 | A | 3/1993 | Peltier |
| 5,198,003 | A | 3/1993 | Haynes |
| 5,199,257 | A | 4/1993 | Colletta et al. |
| 5,210,678 | A | 5/1993 | Lain et al. |
| 5,215,558 | A | 6/1993 | Moon |
| 5,217,504 | A | 6/1993 | Johansson |
| 5,217,511 | A | 6/1993 | Plaks et al. |
| 5,234,555 | A | 8/1993 | Ibbott |
| 5,248,324 | A | 9/1993 | Hara |
| 5,250,267 | A | 10/1993 | Johnson et al. |
| 5,254,155 | A | 10/1993 | Mensi |
| 5,266,004 | A | 11/1993 | Tsumurai et al. |
| 5,271,763 | A | 12/1993 | Jang |
| 5,282,891 | A | 2/1994 | Durham |
| 5,290,343 | A | 3/1994 | Morita et al. |
| 5,296,019 | A | 3/1994 | Oakley et al. |
| 5,302,190 | A | 4/1994 | Williams |
| 5,308,586 | A | 5/1994 | Fritsche et al. |
| 5,315,838 | A | 5/1994 | Thompson |
| 5,316,741 | A | 5/1994 | Sewell et al. |
| 5,330,559 | A | 7/1994 | Cheney et al. |
| 5,348,571 | A | 9/1994 | Weber |
| 5,376,168 | A | 12/1994 | Inculet |
| 5,378,978 | A | 1/1995 | Gallo et al. |
| 5,386,839 | A | 2/1995 | Chen |
| 5,395,430 | A | 3/1995 | Lundgren et al. |
| 5,401,301 | A | 3/1995 | Schulmerich et al. |
| 5,401,302 | A | 3/1995 | Schulmerich et al. |
| 5,403,383 | A | 4/1995 | Jaisinghani |
| 5,405,434 | A | 4/1995 | Inculet |
| 5,407,469 | A | 4/1995 | Sun |
| 5,407,639 | A | 4/1995 | Watanabe et al. |
| 5,417,936 | A | 5/1995 | Suzuki et al. |
| 5,419,953 | A | 5/1995 | Chapman |
| 5,433,772 | A | 7/1995 | Sikora |
| 5,435,817 | A | 7/1995 | Davis et al. |
| 5,435,978 | A | 7/1995 | Yokomi |
| 5,437,713 | A | 8/1995 | Chang |
| 5,437,843 | A | 8/1995 | Kuan |
| 5,445,798 | A | 8/1995 | Ikeda et al. |
| 5,466,279 | A | 11/1995 | Hattori et al. |
| 5,468,454 | A | 11/1995 | Kim |
| 5,474,599 | A | 12/1995 | Cheney et al. |
| 5,484,472 | A | 1/1996 | Weinberg |
| 5,484,473 | A | 1/1996 | Bontempi |
| 5,492,678 | A | 2/1996 | Ota et al. |
| 5,501,844 | A | 3/1996 | Kasting, Jr. et al. |
| 5,503,808 | A | 4/1996 | Garbutt et al. |
| 5,503,809 | A | 4/1996 | Coate et al. |
| 5,505,914 | A | 4/1996 | Tona-Serra |
| 5,508,008 | A | 4/1996 | Wasser |
| 5,514,345 | A | 5/1996 | Garbutt et al. |
| 5,516,493 | A | 5/1996 | Bell et al. |
| 5,518,531 | A | 5/1996 | Joannu |
| 5,520,887 | A | 5/1996 | Shimizu et al. |
| 5,525,310 | A | 6/1996 | Decker et al. |
| 5,529,613 | A | 6/1996 | Yavnieli |
| 5,529,760 | A | 6/1996 | Burris |
| 5,532,798 | A | 7/1996 | Nakagami et al. |
| 5,535,089 | A | 7/1996 | Ford et al. |
| 5,536,477 | A | 7/1996 | Cha et al. |
| 5,538,695 | A | 7/1996 | Shinjo et al. |
| 5,540,761 | A | 7/1996 | Yamamoto |
| 5,542,967 | A | 8/1996 | Ponizovsky et al. |
| 5,545,379 | A | 8/1996 | Gray |
| 5,545,380 | A | 8/1996 | Gray |
| 5,547,643 | A | 8/1996 | Nomoto et al. |
| 5,549,874 | A | 8/1996 | Kamiya et al. |
| 5,554,344 | A | 9/1996 | Duarte |
| 5,554,345 | A | 9/1996 | Kitchenman |
| 5,565,685 | A | 10/1996 | Czako et al. |
| 5,569,368 | A | 10/1996 | Larsky et al. |
| 5,569,437 | A | 10/1996 | Stiehl et al. |
| D375,546 | S | 11/1996 | Lee |
| 5,571,483 | A | 11/1996 | Pfingstl et al. |
| 5,573,577 | A | 11/1996 | Joannou |
| 5,573,730 | A | 11/1996 | Gillum |
| 5,578,112 | A | 11/1996 | Krause |
| 5,578,280 | A | 11/1996 | Kazi et al. |
| 5,582,632 | A | 12/1996 | Nohr et al. |
| 5,587,131 | A | 12/1996 | Malkin et al. |
| D377,523 | S | 1/1997 | Marvin et al. |
| 5,591,253 | A | 1/1997 | Altman et al. |
| 5,591,334 | A | 1/1997 | Shimizu et al. |
| 5,591,412 | A | 1/1997 | Jones et al. |
| 5,593,476 | A | 1/1997 | Coppom |
| 5,601,636 | A | 2/1997 | Glucksman |
| 5,603,752 | A | 2/1997 | Hara |
| 5,603,893 | A | 2/1997 | Gundersen et al. |
| 5,614,002 | A | 3/1997 | Chen |
| 5,624,476 | A | 4/1997 | Eyraud |
| 5,630,866 | A | 5/1997 | Gregg |
| 5,630,990 | A | 5/1997 | Conrad et al. |
| 5,637,198 | A | 6/1997 | Breault |
| 5,637,279 | A | 6/1997 | Besen et al. |
| 5,641,342 | A | 6/1997 | Smith et al. |
| 5,641,461 | A | 6/1997 | Ferone |
| 5,647,890 | A | 7/1997 | Yamamoto |
| 5,648,049 | A | 7/1997 | Jones et al. |
| 5,655,210 | A | 8/1997 | Gregoire et al. |
| 5,656,063 | A | 8/1997 | Hsu |
| 5,665,147 | A | 9/1997 | Taylor et al. |
| 5,667,563 | A | 9/1997 | Silva, Jr. |
| 5,667,564 | A | 9/1997 | Weinberg |
| 5,667,565 | A | 9/1997 | Gondar |
| 5,667,756 | A | 9/1997 | Ho |
| 5,669,963 | A | 9/1997 | Horton et al. |
| 5,678,237 | A | 10/1997 | Powell et al. |
| 5,681,434 | A | 10/1997 | Eastlund |
| 5,681,533 | A | 10/1997 | Hiromi |
| 5,698,164 | A | 12/1997 | Kishioka et al. |
| 5,702,507 | A | 12/1997 | Wang |
| D389,567 | S | 1/1998 | Gudefin |
| 5,766,318 | A | 6/1998 | Loreth et al. |
| 5,779,769 | A | 7/1998 | Jiang |
| 5,785,631 | A | 7/1998 | Heidecke |

| | | | |
|---|---|---|---|
| 5,814,135 | A | 9/1998 | Weinberg |
| 5,879,435 | A | 3/1999 | Satyapal et al. |
| 5,893,977 | A | 4/1999 | Pucci |
| 5,911,957 | A | 6/1999 | Khatchatrian et al. |
| 5,972,076 | A | 10/1999 | Nichols et al. |
| 5,975,090 | A | 11/1999 | Taylor et al. |
| 5,980,614 | A | 11/1999 | Loreth et al. |
| 5,993,521 | A | 11/1999 | Loreth et al. |
| 5,993,738 | A | 11/1999 | Goswani |
| 5,997,619 | A | 12/1999 | Knuth et al. |
| 6,019,815 | A | 2/2000 | Satyapal et al. |
| 6,042,637 | A | 3/2000 | Weinberg |
| 6,063,168 | A | 5/2000 | Nichols et al. |
| 6,086,657 | A | 7/2000 | Freije |
| 6,090,189 | A | 7/2000 | Wikström et al. |
| 6,117,216 | A | 9/2000 | Loreth |
| 6,118,645 | A | 9/2000 | Partridge |
| 6,126,722 | A | 10/2000 | Mitchell et al. |
| 6,126,727 | A | 10/2000 | Lo |
| 6,149,717 | A | 11/2000 | Satyapal et al. |
| 6,149,815 | A | 11/2000 | Sauter |
| 6,152,146 | A | 11/2000 | Taylor et al. |
| 6,163,098 | A | 12/2000 | Taylor et al. |
| 6,176,977 | B1 | 1/2001 | Taylor et al. |
| 6,182,461 | B1 | 2/2001 | Washburn et al. |
| 6,182,671 | B1 | 2/2001 | Taylor et al. |
| 6,187,271 | B1 | 2/2001 | Lee et al. |
| 6,193,852 | B1 | 2/2001 | Caracciolo et al. |
| 6,203,600 | B1 | 3/2001 | Loreth |
| 6,212,883 | B1 | 4/2001 | Kang |
| 6,228,149 | B1 | 5/2001 | Alenichev et al. |
| 6,251,171 | B1 | 6/2001 | Marra et al. |
| 6,252,012 | B1 | 6/2001 | Egitto et al. |
| 6,270,733 | B1 | 8/2001 | Rodden |
| 6,277,248 | B1 | 8/2001 | Ishioka et al. |
| 6,282,106 | B2 | 8/2001 | Grass |
| D449,097 | S | 10/2001 | Smith et al. |
| D449,679 | S | 10/2001 | Smith et al. |
| 6,296,692 | B1 | 10/2001 | Gutmann |
| 6,302,944 | B1 | 10/2001 | Hoenig |
| 6,309,514 | B1 | 10/2001 | Conrad et al. |
| 6,312,507 | B1 | 11/2001 | Taylor et al. |
| 6,315,821 | B1 | 11/2001 | Pillion et al. |
| 6,328,791 | B1 | 12/2001 | Pillion et al. |
| 6,348,103 | B1 | 2/2002 | Ahlborn et al. |
| 6,350,417 | B1 | 2/2002 | Lau et al. |
| 6,362,604 | B1 | 3/2002 | Cravey |
| 6,372,097 | B1 | 4/2002 | Chen |
| 6,373,723 | B1 | 4/2002 | Wallgren et al. |
| 6,379,427 | B1 | 4/2002 | Siess |
| 6,391,259 | B1 | 5/2002 | Malkin et al. |
| 6,398,852 | B1 | 6/2002 | Loreth |
| 6,447,587 | B1 | 9/2002 | Pillion et al. |
| 6,451,266 | B1 | 9/2002 | Lau et al. |
| 6,464,754 | B1 | 10/2002 | Ford |
| 6,471,753 | B1 | 10/2002 | Ahn et al. |
| 6,494,940 | B1 | 12/2002 | Hak |
| 6,497,754 | B2 | 12/2002 | Joannou |
| 6,504,308 | B1 | 1/2003 | Krichtafovitch et al. |
| 6,506,238 | B1 | 1/2003 | Endo |
| 6,508,982 | B1 | 1/2003 | Shoji |
| 6,544,485 | B1 | 4/2003 | Taylor |
| 6,576,046 | B2 | 6/2003 | Pruette et al. |
| 6,588,434 | B2 | 7/2003 | Taylor et al. |
| 6,603,268 | B2 | 8/2003 | Lee |
| 6,613,277 | B1 | 9/2003 | Monagan |
| 6,632,407 | B1 | 10/2003 | Lau et al. |
| 6,635,105 | B2 | 10/2003 | Ahlborn et al. |
| 6,635,106 | B2 | 10/2003 | Katou et al. |
| 6,672,315 | B2 | 1/2004 | Taylor et al. |
| 6,680,028 | B1 | 1/2004 | Harris |
| 6,709,484 | B2 | 3/2004 | Lau et al. |
| 6,713,026 | B2 | 3/2004 | Taylor et al. |
| 6,735,830 | B1 | 5/2004 | Merciel |
| 6,749,667 | B2 | 6/2004 | Reeves et al. |
| 6,753,652 | B2 | 6/2004 | Kim |
| 6,761,796 | B2 | 7/2004 | Srivastava et al. |
| 6,768,108 | B2 | 7/2004 | Hirano et al. |
| 6,768,110 | B2 | 7/2004 | Alani |
| 6,768,120 | B2 | 7/2004 | Leung et al. |
| 6,768,121 | B2 | 7/2004 | Horskey |
| 6,770,878 | B2 | 8/2004 | Uhlemann et al. |
| 6,774,359 | B1 | 8/2004 | Hirabayashi et al. |
| 6,777,686 | B2 | 8/2004 | Olson et al. |
| 6,777,699 | B1 | 8/2004 | Miley et al. |
| 6,777,882 | B2 | 8/2004 | Goldberg et al. |
| 6,781,136 | B1 | 8/2004 | Kato |
| 6,785,912 | B1 | 9/2004 | Julio |
| 6,791,814 | B2 | 9/2004 | Adachi et al. |
| 6,794,661 | B2 | 9/2004 | Tsukihara et al. |
| 6,797,339 | B2 | 9/2004 | Akizuki et al. |
| 6,797,964 | B2 | 9/2004 | Yamashita |
| 6,799,068 | B1 | 9/2004 | Hartmann et al. |
| 6,800,862 | B2 | 10/2004 | Matsumoto et al. |
| 6,803,585 | B2 | 10/2004 | Glukhoy |
| 6,805,916 | B2 | 10/2004 | Cadieu |
| 6,806,035 | B1 | 10/2004 | Atireklapvarodom et al. |
| 6,806,163 | B2 | 10/2004 | Wu et al. |
| 6,806,468 | B2 | 10/2004 | Laiko et al. |
| 6,808,606 | B2 | 10/2004 | Thomsen et al. |
| 6,809,310 | B2 | 10/2004 | Chen |
| 6,809,312 | B1 | 10/2004 | Park et al. |
| 6,809,325 | B2 | 10/2004 | Dahl et al. |
| 6,812,647 | B2 | 11/2004 | Cornelius |
| 6,815,690 | B2 | 11/2004 | Veerasamy et al. |
| 6,818,257 | B2 | 11/2004 | Amann et al. |
| 6,818,909 | B2 | 11/2004 | Murrell et al. |
| 6,819,053 | B2 | 11/2004 | Johnson |
| 6,863,869 | B2 | 3/2005 | Lau et al. |
| 6,893,618 | B2 | 5/2005 | Kotlyar et al. |
| 6,897,617 | B2 | 5/2005 | Lee |
| 6,899,745 | B2 | 5/2005 | Gatchell et al. |
| 6,908,501 | B2 | 6/2005 | Reeves et al. |
| 6,958,134 | B2 | 10/2005 | Taylor et al. |
| 6,974,560 | B2 | 12/2005 | Taylor et al. |
| 6,984,987 | B2 | 1/2006 | Taylor et al. |
| 7,531,027 | B2 * | 5/2009 | Tepper et al. ..................... 96/27 |
| 2001/0048906 | A1 | 12/2001 | Lau et al. |
| 2002/0079212 | A1 | 6/2002 | Taylor et al. |
| 2002/0098131 | A1 | 7/2002 | Taylor et al. |
| 2002/0122751 | A1 | 9/2002 | Sinaiko et al. |
| 2002/0122752 | A1 | 9/2002 | Taylor et al. |
| 2002/0127156 | A1 | 9/2002 | Taylor |
| 2002/0134665 | A1 | 9/2002 | Taylor et al. |
| 2002/0144601 | A1 | 10/2002 | Palestro et al. |
| 2002/0146356 | A1 | 10/2002 | Sinaiko et al. |
| 2002/0150520 | A1 | 10/2002 | Taylor et al. |
| 2002/0152890 | A1 | 10/2002 | Leiser |
| 2002/0155041 | A1 | 10/2002 | McKinney, Jr. et al. |
| 2002/0190658 | A1 | 12/2002 | Lee |
| 2002/0195951 | A1 | 12/2002 | Lee |
| 2003/0170150 | A1 | 9/2003 | Law et al. |
| 2003/0206837 | A1 | 11/2003 | Taylor et al. |
| 2004/0033176 | A1 | 2/2004 | Lee et al. |
| 2004/0096376 | A1 | 5/2004 | Taylor |
| 2004/0136863 | A1 | 7/2004 | Yates et al. |
| 2004/0166037 | A1 | 8/2004 | Youdell et al. |
| 2004/0226447 | A1 | 11/2004 | Lau et al. |
| 2004/0234431 | A1 | 11/2004 | Taylor et al. |
| 2004/0251124 | A1 | 12/2004 | Lau |
| 2005/0000793 | A1 | 1/2005 | Taylor et al. |

FOREIGN PATENT DOCUMENTS

| | | | |
|---|---|---|---|
| GB | 643363 | | 9/1950 |
| JP | 51-90077 | | 6/1976 |
| JP | 62-20653 | | 2/1987 |
| JP | 10137007 | | 5/1998 |
| JP | 11104223 | | 4/1999 |
| JP | 2000236914 | | 9/2000 |
| WO | 92/05875 | A1 | 4/1992 |
| WO | 96/04703 | A1 | 2/1996 |
| WO | 99/07474 | A1 | 2/1999 |
| WO | WO 00/10713 | A1 | 3/2000 |
| WO | WO 01/47803 | A1 | 7/2001 |
| WO | WO 01/48781 | A1 | 7/2001 |
| WO | WO 01/64349 | A1 | 9/2001 |
| WO | WO 01/85348 | A2 | 11/2001 |
| WO | WO 02/20162 | A2 | 3/2002 |

| | | | |
|---|---|---|---|
| WO | WO 02/20163 | A2 | 3/2002 |
| WO | WO 02/30574 | A1 | 4/2002 |
| WO | WO 02/32578 | A1 | 4/2002 |
| WO | WO 02/42003 | A1 | 5/2002 |
| WO | WO 02/066167 | A1 | 8/2002 |
| WO | WO 03/009944 | A1 | 2/2003 |
| WO | WO 03/013620 | A1 | 2/2003 |
| WO | WO 03/013734 | | 2/2003 |

* cited by examiner

AIR TREATMENT APPARATUS HAVING A LIQUID HOLDER AND A BIPOLAR IONIZATION DEVICE

PRIORITY CLAIM

This application is a continuation-in-part of, and claims priority to and the benefit of: (a) U.S. patent application Ser. No. 11/007,734, filed Dec. 8, 2004, now U.S. Pat. No. 7,517,505, which, in turn, claims priority to U.S. Patent Application Ser. No. 60/500,437, filed Sep. 5, 2003, now expired; and (b) U.S. patent application Ser. No. 10/791,561, filed Mar. 2, 2004, now U.S. Pat. No. 7,517,503, all of which are incorporated herein by reference in their entirety.

CROSS REFERENCE TO RELATED APPLICATIONS

U.S. pending patent application No. 90/007,276, filed Oct. 29, 2004;

U.S. patent application Ser. No. 09/419,720, filed Oct. 14, 1999, now U.S. Pat. No. 6,504,308;

U.S. patent application Ser. No. 11/041,926, filed Jan. 21, 2005, now U.S. Pat. No. RE41,812;

U.S. patent application Ser. No. 09/231,917, filed Jan. 14, 1999, now U.S. Pat. No. 6,125,636;

U.S. patent application Ser. No. 11/091,243, filed Mar. 28, 2005, now U.S. Pat. No. 7,285,155;

U.S. patent application Ser. No. 10/978,891, filed Nov. 1, 2004, now abandoned;

U.S. patent application Ser. No. 11/087,969, filed Mar. 23, 2005, now U.S. Pat. No. 7,056,370;

U.S. patent application Ser. No. 09/197,131 filed Nov. 20, 1998, now U.S. Pat. No. 6,585,935;

U.S. patent application Ser. No. 08/924,580, filed Sep. 5, 1997, now U.S. Pat. No. 5,802,865;

U.S. patent application Ser. No. 09/148,843, filed Sep. 4, 1998, now U.S. Pat. No. 6,189,327;

U.S. patent application Ser. No. 09/232,196, filed Jan. 14, 1999, now U.S. Pat. No. 6,163,098;

U.S. patent application Ser. No. 10/454,132, filed Jun. 4; 2003, now U.S. Pat. No. 6,827,088;

U.S. patent application Ser. No. 09/721,055, filed Nov. 22, 2000, now U.S. Pat. No. 6,640,049;

U.S. patent application Ser. No. 09/669,253, filed Sep. 25, 2000, now U.S. Pat. No. 6,632,407;

U.S. patent application Ser. No. 09/249,375, filed Feb. 12, 1999, now U.S. Pat. No. 6,312,507;

U.S. patent application Ser. No. 09/742,814, filed Dec. 19, 2000, now U.S. Pat. No. 6,672,315;

U.S. patent application Ser. No. 09/415,576, filed Oct. 8, 1999, now U.S. Pat. No. 6,182,671;

U.S. patent application Ser. No. 09/344,516, filed Jun. 25, 1999, now U.S. Pat. No. 6,152,146;

U.S. patent application Ser. No. 09/163,024, filed Sep. 29, 1998, now U.S. Pat. No. 5,975,090;

U.S. patent application Ser. No. 11/062,057, filed Feb. 18, 2005 now abandoned;

U.S. patent application Ser. No. 10/188,668, filed Jul. 2, 2002, now U.S. Pat. No. 6,588,431;

U.S. patent application Ser. No. 10/815,230, filed Mar. 30, 2004, now U.S. Pat. No. 6,953,556;

U.S. patent application Ser. No. 11/071,779, filed Mar. 3, 2005, now U.S. Pat. No. 7,767,165;

U.S. patent application Ser. No. 10/994,869, filed Nov. 22, 2004, now U.S. Pat. No. 7,767,169;

U.S. patent application Ser. No. 11/007,556, filed. Dec. 8, 2004, now U.S. Pat. No. 7,291,207;

U.S. patent application Ser. No. 11/003,894, filed Dec. 3, 2004, now abandoned;

U.S. patent application Ser. No. 10/661,988, filed Sep. 12, 2003, now U.S. Pat. No. 7,097,695;

U.S. patent application Ser. No. 10/774,579, filed Feb. 9, 2004, now U.S. Pat. No. 7,077,890;

U.S. patent application Ser. No. 09/730,499, filed Dec. 5, 2000, now U.S. Pat. No. 6,713,026;

U.S. patent application Ser. No. 10/156,158, filed May 28, 2002, now U.S. Pat. No. 6,863,869;

U.S. patent application Ser. No. 09/186,471, filed Nov. 5, 1998, now U.S. Pat. No. 6,176,977;

U.S. patent application Ser. No. 10/835,743, filed Apr. 30, 2004, now U.S. Pat. No. 6,908,501;

U.S. patent application Ser. No. 10/658,721, filed Sep. 9, 2003, now U.S. Pat. No. 6,896,853;

U.S. patent application Ser. No. 10/074,209, filed Feb. 12, 2002 now U.S. Pat. No. 7,695,690;

U.S. patent application Ser. No. 10/023,460, filed Dec. 13, 2001, now abandoned;

U.S. patent application Ser. No. 10/379,966, filed Mar. 5, 2003, now abandoned;

U.S. patent application Ser. No. 10/685,182, filed Oct. 14, 2003, now U.S. Pat. No. 7,404,935;

U.S. patent application Ser. No. 10/944,016, filed Sep. 17, 2004 now U.S. Pat. No. 6,963,504;

U.S. patent application Ser. No. 10/074,096, filed Feb. 12, 2002, now U.S. Pat. No. 6,974,560;

U.S. patent application Ser. No. 10/074,347, filed Feb. 12, 2002, now U.S. Pat. No. 6,911,186;

U.S. patent application Ser. No. 10/795,934, filed Mar. 8, 2004, now U.S. Pat. No. 7,517,504;

U.S. pending patent application Ser. No. 10/435,289, filed May 9, 2003;

U.S. patent application Ser. No. 09/774,198, filed Jan. 29, 2001, now U.S. Pat. No. 6,544,485;

U.S. patent application Ser. No. 11/064,797, filed Feb. 24, 2005, now abandoned;

U.S. patent application Ser. No. 11/003,034, filed Dec. 3, 2004, now abandoned;

U.S. patent application Ser. No. 11/003,671, filed Dec. 3, 2004, now abandoned;

U.S. patent application Ser. No. 11/003,035, filed Dec. 3, 2004, now U.S. Pat. No. 7,318,856;

U.S. patent application Ser. No. 11/007,395, filed Dec. 8, 2001;

U.S. patent application Ser. No. 10/074,827, filed Feb. 12, 2002, now abandoned;

U.S. patent application Ser. No. 10/876,495, filed Jun. 25, 2004, now abandoned;

U.S. patent application Ser. No. 10/809,923, filed Mar. 25, 2004, now U.S. Pat. No. 7,405,672;

U.S. patent application Ser. No. 11/062,173, filed Feb. 18, 2005, now abandoned;

U.S. patent application Ser. No. 10/074,082, filed Feb. 12, 2002, now U.S. Pat. No. 6,958,134;

U.S. patent application Ser. No. 10/278,193, filed Oct. 21, 2002, now U.S. Pat. No. 6,749,667;

U.S. patent application Ser. No. 09/924,600, filed Aug. 8, 2001, now U.S. Pat. No. 6,709,481;

U.S. patent application Ser. No. 09/564,960, filed May 4, 2000, now U.S. Pat. No. 6,350,417;

U.S. patent application Ser. No. 10/806,293, filed Mar. 22, 2004, now U.S. Pat. No. 6,972,057;

U.S. pending patent application Ser. No. 11/004,397, filed Dec. 3, 2004;

U.S. patent application Ser. No. 10/895,799, filed Jul. 21, 2004, now abandoned;

U.S. patent application Ser. No. 10/625,401, filed Jul. 23, 2003, now U.S. Pat. No. 6,984,987;

U.S. patent application Ser. No. 10/642,927, filed Aug. 18, 2003, now abandoned;

U.S. patent application Ser. No. 10/823,346, filed Apr. 12, 2004, now U.S. Pat. No. 7,220,295;

U.S. patent application Ser. No. 10/662,591, filed Sep. 15, 2003, now U.S. Pat. No. 7,371,354;

U.S. patent application Ser. No. 11/061,967, filed Feb. 18, 2005, now abandoned;

U.S. patent application Ser. No. 11/150,046, filed Jun. 10, 2005, now U.S. Pat. No. 7,662,348;

U.S. pending patent application Ser. No. 11/188,448, filed Jul. 25, 2005;

U.S. patent application Ser. No. 11/188,478, filed Jul. 25, 2005, now U.S. Pat. No. 7,311,762;

U.S. Patent Application No. 60/777,943, filed Feb. 25, 2006, now expired;

U.S. pending patent application Ser. No. 11/293,538, filed Dec. 2, 2005;

U.S. patent application Ser. No. 10/794,526, filed Mar. 4, 2004, now U.S. Pat. No. 7,014,686;

U.S. pending patent application Ser. No. 11/457,396, filed Jul. 13, 2006;

U.S. patent application Ser. No. 10/168,723, filed Jun. 21, 2002, now U.S. Pat. No. 6,897,617; and U.S. patent application Ser. No. 10/168,724, filed Jun. 21, 2002, now U.S. Pat. No. 6,603,268; and U.S. pending patent application Ser. No. 11/464,139, filed Aug. 11, 2006.

BACKGROUND

Known electrostatic air cleaning machines can emit ions having a single polarity or perform unipolarization (e.g., either negative or positive ions) of air molecules. This unipolarization can create unbalanced electric charges in the air (air or water ions), which can cause undesirable effects such as wall plating. Wall plating can be caused when particles of dust accept an electric charge (e.g., positive or negative) and get deposited on walls, furniture or other objects creating dark spots. Additionally, depending upon the conditions, charges in the air of any polarity can lead to the malfunctioning of electronic equipment and cause unpleasant, harmful or damaging electric shock. Therefore, there is a need to overcome such disadvantages or otherwise lessen the effects of such disadvantages.

DETAILED DESCRIPTION

Figure 1:
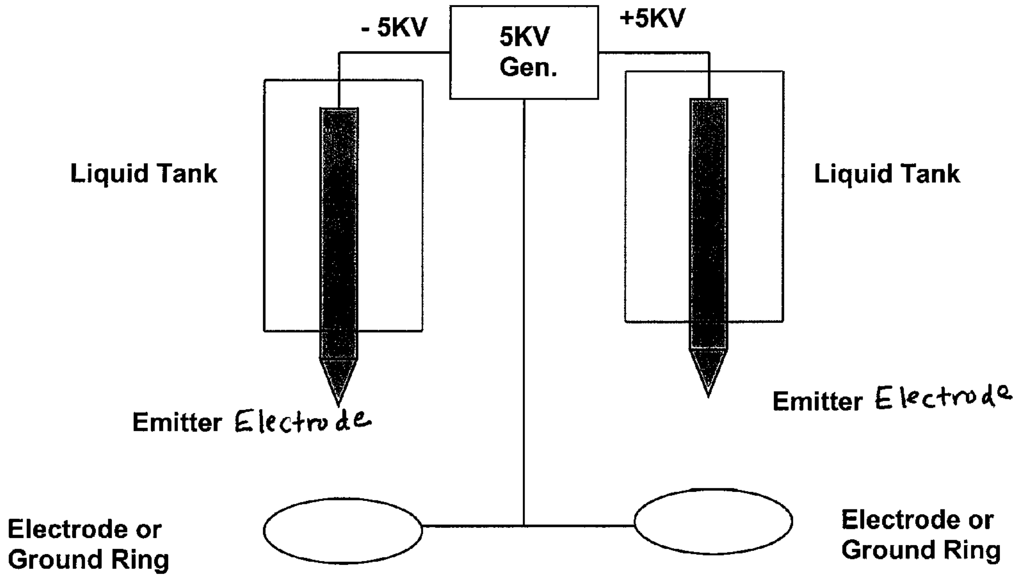
FIG. 1 is a schematic diagram of one embodiment of an air treatment apparatus using bipolarionization.

Referring to FIG. 1, in one embodiment, the air treatment apparatus includes a bipolar ionization device which includes two independent emitters, each of which is an electrode. The emitters are coupled to separate voltage supplies having opposite polarities. For example, in FIG. 1, one emitter is coupled to a positive voltage supply (+5 KV) and one emitter is coupled to a negative voltage supply (−5 KV). Each voltage supply establishes an electric field between an emitter and a corresponding electrode or ground ring. Two independent fluid sources, such as liquid holders or tanks provide a source of liquid to each of the emitters. Each emitter, for example, includes a sharp conical ceramic stick that has a porous structure and supplies water or another liquid to the sharp tip or end of the stick using a "wick effect" (i.e., capillary effect); if the stick is pointed up or gravity pulling the liquid down if the sharp point is facing downward.

The combination of the electric field (i.e., between each emitter and electrode) and the "wick effect" cause each emitter to generate charged micro-droplets of liquid that have nanometer particle size (in range of 3 to 100 nm). The liquid droplets are charged by the electric field generated between the sharp point of the emitter and an electrode or ground ring located in the vicinity of the sharp point of the emitter. The charged liquid droplets break down to a fine mist or fine particulates of charged liquid due to electrostatic liquid atomization.

A droplets tend to have a spherical shape because of the surface tension of the liquid. If it is electrically charged, the electrostatic repulsion between ions might overcome the surface tension, leading to its breakup. Upper estimates for the charge in spherical systems are given by the Rayleigh limits:

$$\text{Sphere: } q^2 = 64\pi^2 \epsilon \sigma r^3$$

where:

$\epsilon$ is the permittivity of the medium surrounding the droplet.

$\sigma$ is the surface tension of the liquid.

r is the radius of the droplet.

In this embodiment, one emitter generates positively charged liquid droplets and positive ions, and the other emitter generates negatively charged liquid droplets and negative ions. Sufficient airflow through the air treatment apparatus is provided so that the mist of liquid droplets, carry an electric charge, are dispersed throughout the surrounding environment thereby avoiding immediate recombination of oppositely charged liquid droplets. The mist of droplets can be transported by airflow provided by a fan or electrostatic wind. Together, both emitters produce a bipolar distribution of ionized liquid droplets or particles.

Charged liquid droplets of nanometer particle size have germicidal, deodorization and other air treatment effects, including, but not limited to, humidification. These effects are attributed to chemical reactions between, for example, ionized water and ionized oxygen molecules in the air.

Another benefit of this embodiment is that positively charged hydrogen ions and negatively charged oxygen ions collide and form highly reactive $OH^-$ hydroxyl radicals. A hydroxyl radical is unstable and to stabilize itself, it will take away one hydrogen atom from any airborne particle it encounters, which forms water vapor in the process and chemically alters the micro-particle. Thus, the hydroxyl radicals have a beneficial deodorizing effects and other air treatment effects.

Figure 2:
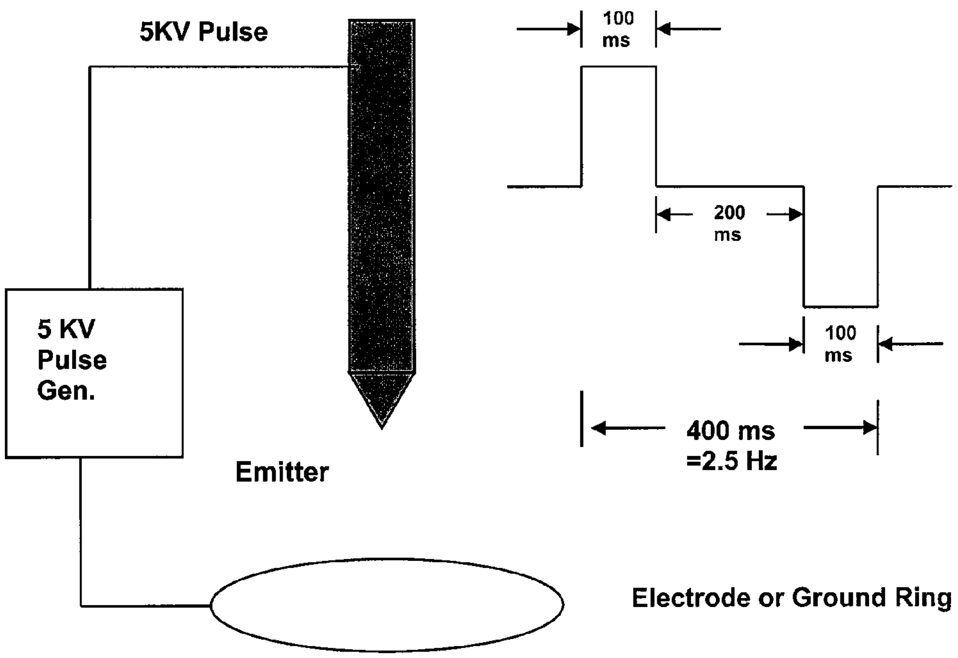
FIG. 2 is a schematic diagram of another embodiment of an air treatment apparatus using bipolarionization.

Referring to FIG. 2, in one embodiment, the air treatment apparatus includes a bipolar ionization device which has a single emitter that receives power from a pulse voltage supply. The pulse voltage supply generates a sequence of positive and negative voltage pulses that, in turn, cause the emitter to generate a bipolar distribution of charged particles, that is, positively and negatively charged particles of liquid and ions intermittently. Air velocity, pulse duration and pulse period can be adjusted to provide relatively uniform and efficient distribution of the charged liquid droplets and ions in the surrounding environment. The emitter (e.g., sharp ceramic stick) can be under high potential or under ground potential.

Additionally, the emitter may have any orientation in space as long as it supplies charge liquid droplets. By way of example, the emitter can be a ceramic stick, hypodermic needle or any other capillary device that has a regulated liquid supply and a sharp point sufficient for the emission of charged liquid droplets. The emitter can be made from a porous metal or any other porous materials. It is also contemplated that this embodiment can be implemented for bipolar atomization and ionization of different liquid substances including, but not limited to, various deodorants, perfumes, fragrances or aromas.

In one embodiment, the air treatment apparatus includes an elongated housing that supports the bipolarization components illustrated in FIGS. 1 and 2. Though the housing has an elongated shape, it should be understood that other shapes for the air treatment apparatus are suitable. The front of the air treatment apparatus includes an air outlet with a plurality of fins, slats or louvers that facilitate air flow from the apparatus. In this embodiment, the air treatment apparatus can be embodied in a relatively small plug-in device which has a housing coupled to a plurality of prongs. The prongs are configured to mate with the openings defined by an electrical wall outlet. By way of example, the air treatment apparatus receives power from a wall outlet and, in operation, emits both positively and negatively charge liquid droplets. The flow of charged liquid droplets from the air treatment apparatus can be facilitated by a small fan, which also received power from the wall outlet. The flow of liquid droplets and ions from the air treatment apparatus help to balance the electric charge in the air as well as provide germicidal, deodorization and humidification benefits to the surrounding environment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An air treatment apparatus, comprising:

a plug-in housing having a plurality of electro-conductive prongs coupled to the housing, the prongs configured to plug into an electrical wall outlet that provides power to the housing, whereby the plug-in housing attaches to the electrical wall outlet via the prongs;

a fan disposed within the housing for drawing air in and out of the housing;

at least two separate liquid supply containers disposed within the housing;

a plurality of electrodes supported by the housing, including: (a) at least two liquid-receiving electrodes configured to respectively receive liquid from separate liquid supply containers; and (b) a second electrode coupled to the ground; and a voltage supply operatively coupled to the at least two liquid-receiving electrodes, wherein the voltage supply provides a negative voltage to one liquid-receiving electrode and a positive voltage to the other liquid-receiving electrode.

2. The air treatment apparatus of claim 1, wherein the liquid supply container includes an aromatic liquid.

3. The air treatment apparatus of claim 2, wherein the housing further comprises an air inlet and an air outlet, the air outlet further comprising a plurality of fins that facilitate air flow from the housing.

4. The air treatment apparatus of claim 1, wherein the voltage supply configured to generate a sequence of positive and negative voltage pulses.

5. The air treatment apparatus of claim 1, wherein a liquid-receiving electrode has a conical shape and a porous structure.

6. The air treatment apparatus of claim 5, wherein electric potential is generated between a tip of the liquid-receiving electrode and the second electrode.

* * * * *